Figure 1:
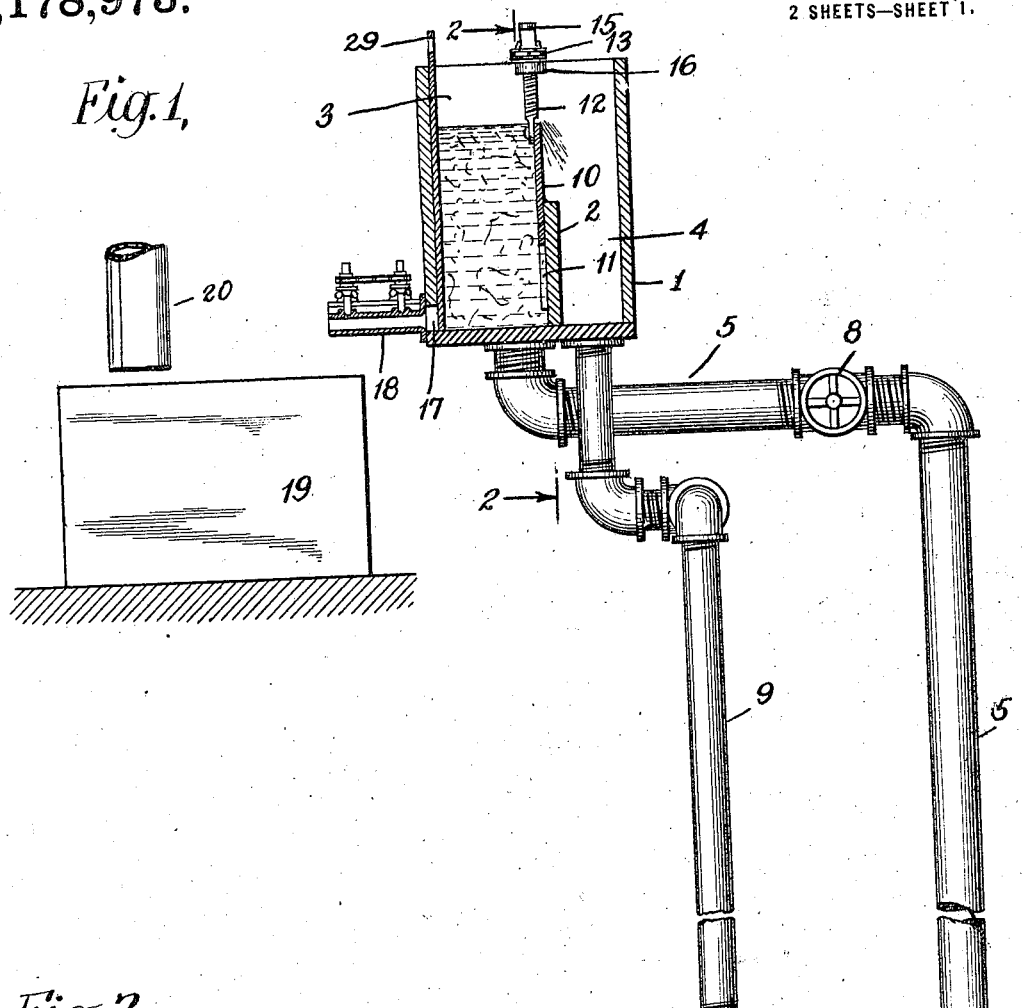

E. J. TRIMBEY.
REGULATING APPARATUS FOR PAPER STOCK.
APPLICATION FILED OCT. 26, 1915.

1,178,973.

Patented Apr. 11, 1916.
2 SHEETS—SHEET 1.

INVENTOR
Edward James Trimbey
BY
Pennie Davis Marvin
ATTORNEYS

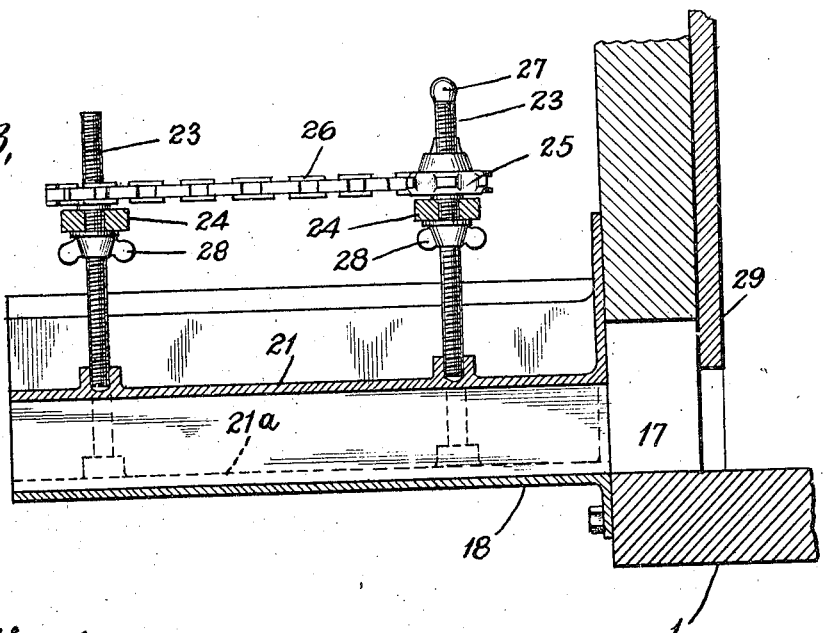
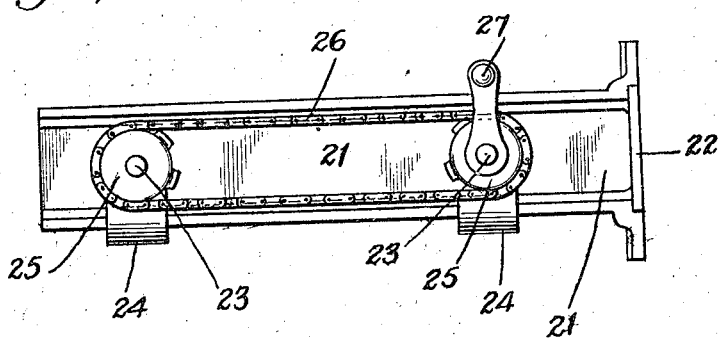
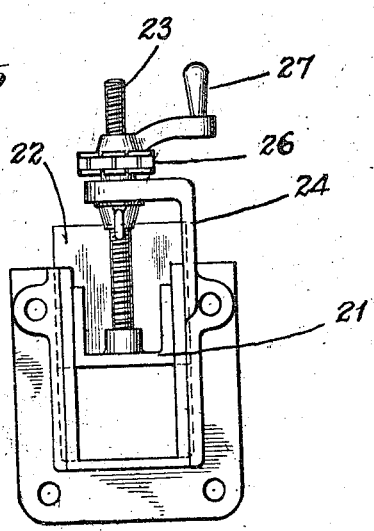

UNITED STATES PATENT OFFICE.

EDWARD J. TRIMBEY, OF GLENS FALLS, NEW YORK.

REGULATING APPARATUS FOR PAPER-STOCK.

1,178,973.  Specification of Letters Patent.  Patented Apr. 11, 1916.

Application filed October 26, 1915. Serial No. 57,928.

*To all whom it may concern:*

Be it known that I, EDWARD J. TRIMBEY, a citizen of the United States, residing at Glens Falls, Warren county, State of New York, have invented certain new and useful Improvements in Regulating Apparatus for Paper-Stock; and I do hereby declare the following to be a full, clear, and exact description of the invention, such as will enable others skilled in the art to which it appertains to make and use the same.

My invention relates to improvements in regulating apparatus or regulating boxes for controlling the volume of wet paper stock delivered to paper machines; and it comprises such a regulating apparatus constructed and arranged to supply to the paper machine an approximately constant equivalent weight of dry paper stock per unit of time in an automatic and continuous manner.

It is a primary object of my invention to so control the volume of wet paper stock delivered that any desired equivalent weight of dry paper stock per unit of time can be furnished to the paper machine, and, when any definite equivalent weight of dry paper stock per unit of time is being furnished, to maintain this weight approximately constant regardless of the variations in the per cent. consistency of the wet paper stock, within the limits of the per cent. consistency ordinarily met with in practice.

The term "per cent. consistency", or simply "consistency", is used in the present specification to denote the number of parts of bone dry paper stock in one hundred parts of wet paper stock. It is common practice to feed the wet paper stock through the regulating boxes at a consistency of about 3.5%, and to dilute the paper stock to, for example, 0.7% in the mixing box, before its ultimate use in the paper machines.

It is important that the amount of wet paper stock delivered to the paper machine be approximately constant in order that the paper made may be more nearly uniform. Variations in the consistency of the paper stock, where the volume remains constant, result in corresponding variations in the weight per unit area of the paper. It is accordingly important to control not only the volume of the paper stock, but to so control this volume with respect to the consistency of the paper stock that an approximately constant equivalent weight of dry paper stock will be furnished to the paper machine per unit of time.

As the per cent. consistency of the wet paper stock varies, the frictional resistance opposing its flow through pipes or spouts also varies. This variation is made use of in the apparatus of the present invention by providing the regulating box of a paper machine with an outlet pipe or spout of suitable length and cross-sectional area to give an outflow velocity and volume of the paper stock therethrough approximately inversely proportional to the paper stock consistency, whereby an approximately constant equivalent weight of dry paper stock is discharged therethrough per unit of time in an automatic and continuous manner.

It is a further object of the present invention to provide for increasing or decreasing the supply of the wet paper stock from the regulating box, while still maintaining an approximately constant equivalent weight of dry paper stock at the desired increased or decreased supply. This change or regulation of the supply is effected, according to the present invention, in either of two ways, or, better, by a combination of both ways. According to one way of effecting this regulation, the regulating box is provided with an overflow dam for maintaining a constant head of the paper stock therein and this overflow dam is made adjustable so that the constant head can be increased or decreased, and the velocity and volume of the outflow thereby correspondingly increased or decreased. This regulation of the supply can also be effected, according to the present invention, by changing the cross-sectional area of the outlet pipe or spout, whereby the outflow volume may be correspondingly increased or decreased with increase or decrease of the cross-sectional area. These two structures for effecting the variation in the wet paper stock supply can, to advantage, be combined in the same structure so that they will coöperate with each other, and so that either structure can be used independently, or both together.

The invention will be further described in connection with the embodiments thereof illustrated in the accompanying drawings, in which—

Figure 2:
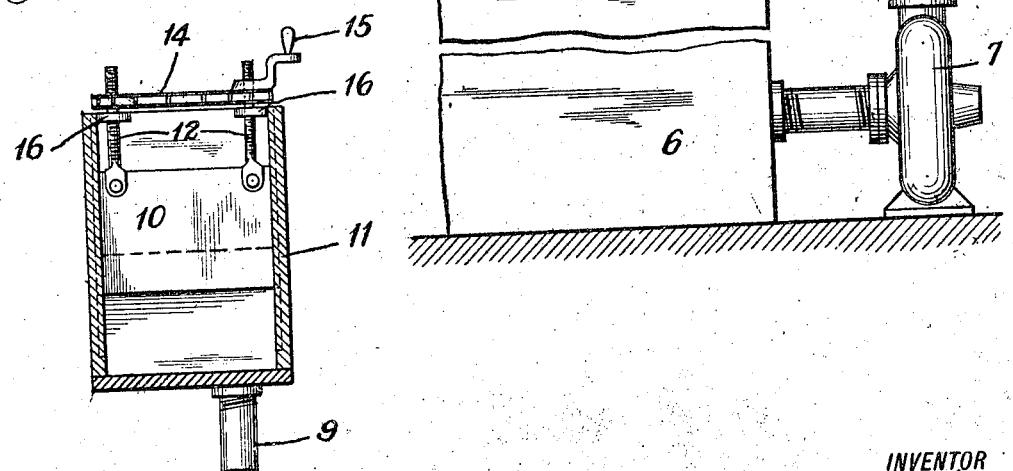

Figure 1 shows the regulating apparatus of the present invention in elevation and with parts in section. Fig. 2 is a sectional view taken on the line 2—2 of Fig. 1. Fig. 3 is a vertical sectional view of the discharge pipe or spout. Fig. 4 is a plan view of the discharge pipe or spout, and Fig. 5 is an end view of the discharge pipe or spout.

In the apparatus illustrated, the head-box 1 is provided with a stationary partition 2 dividing the head-box into an inlet compartment 3 and an overflow or outlet compartment 4. The wet paper stock is supplied to the inlet compartment 3 through the pipe 5 from the supply or stuff chest 6 by means of the pump 7. This supply pipe is further provided with a regulating valve 8. From the overflow or return compartment 4 the paper stock flows back to the stuff chest through the return pipe 9.

The stationary partition 2 extends up only a short distance in the head-box 1. Above this stationary partition and overlapping the same, is the adjustable overflow dam or partition 10, working in suitable guides 11 in the sides of the head box, and supported by suitable supports or bolts 12 at both ends. These supports are arranged to permit adjustment of the dam 10, the particular adjusting means shown being nuts or cogwheels 13, connected together by a sprocket chain 14, and operated by a handle 15. These nuts or cogwheels 13 are threaded upon the bolts 12 so that, by operating the handle 15, the bolts 12 will be simultaneously raised or lowered, and the overflow dam or partition uniformly raised or lowered to a corresponding degree. The bolts 12 are guided in and the nuts or cogwheels 13 are supported by brackets 16 extending inwardly from the side of the regulating box.

The regulating box 1 is provided with an outlet opening 17 and with an outlet pipe or spout 18 bolted or otherwise suitably secured thereto. This outlet pipe or spout is arranged to discharge into the mixing box 19, in which the paper stock can be diluted with water entering through the pipe 20 to the desired lower per cent. consistency. The outlet pipe or spout 18 is shown as of uniform width and of a box-like construction, open at its ends and top. The top, however, is closed by an adjustable top or cover member 21 having an extension 22 at its inner end for covering part of the outlet opening 17 when the cross-sectional area of the outlet pipe or spout is less than the area of this opening.

The adjustable top or cover member 21 is adjustably supported by bolts 23, working in brackets 24, carried by the bottom portion of the outlet pipe or spout. These bolts are simultaneously adjustable by nuts or cogwheels 25, connected together by the chain 26 and by the operating handle 27. Lock-nuts 28 are provided for holding the bolts and the member 21 in adjusted position. The top or cover member 21 is shown in its lowered position in dotted lines in Fig. 3. It will be seen that this member can be raised or lowered to increase or decrease the cross-section of the outlet pipe or spout, and that the member is raised and lowered uniformly throughout its length.

In order to shut off the outflow, a suitable slide valve 29 is provided. This is shown in Figs. 1 and 3 as arranged inside the regulating box where it does not interfere with the adjustment of the outlet pipe or spout. By raising this valve member 29, the full cross-sectional area of the outlet pipe or spout will be uncovered, while by lowering this valve member, the paper stock supply can be entirely stopped.

In the operation of the apparatus above described, the paper stock will be supplied to the regulating box from the supply or stuff chest 11 by means of the pump 7. The paper stock will rise in the regulating box to the top of the overflow partition and the excess paper stock will then overflow and return to the stuff chest through the return pipe 9. A constant head of the paper stock will be maintained in the regulating box and this constant head can be increased or decreased by means of the adjustable overflow partition or dam 10. Upon raising the slide valve 29, the paper stock will flow into the mixing box 19 where it can be diluted with water or otherwise treated. The outlet pipe or spout 18 can be adjusted to give an outflow of the required amount. The length and cross-sectional area of this outlet pipe or spout are such, with reference to the height of the overflow dam within the regulating box, that the variations in the velocity through this pipe or spout due to an increase or to a decrease in the per cent. consistency of the wet paper stock (within the range of the variations in per cent. consistency ordinarily met with in practice) are approximately inversely proportional to the increase or the decrease in the per cent. consistency. As a result, the velocity and volume of the outflow will decrease with increase in the paper stock consistency, and increase with decrease in the consistency, and these variations will be approximately inversely proportional, so that an approximately constant equivalent weight of dry paper stock will be supplied per unit of time without adjustment or changes by the operator. When the supply has been regulated to the required amount, this supply will then be automatically and continuously maintained. When it is desired to change the supply and to increase or decrease the equivalent weight of dry paper stock furnished to the paper machine per unit of time, this may be done either by changing the cross-sectional area of the outlet spout while a constant height of the overflow dam and a resulting constant height of the paper stock are maintained, or by changing the height of the overflow dam within the regulating box and thereby changing the constant head of the paper stock, while maintaining the outlet pipe of constant cross-sectional area. This regulation may, further, be effected by changing both the cross-sectional area of the outlet pipe or spout, and the height of the overflow dam within the regulating box, and thereby varying both the constant head of the paper stock and the cross-sectional area of the outlet.

It will be seen that it is an essential feature of the present invention that the regulating box of a paper machine is provided with an outlet pipe or spout of such length and cross-sectional area that the variations in the velocity of the wet paper stock flowing through this outlet pipe or spout are approximately inversely proportional to the increase or decrease in the per cent. consistency of such wet paper stock. It will further be seen that the equivalent weight of dry paper stock supplied to the paper machine per unit of time can be changed by changing either the height of the overflow dam in the regulating box, or the cross-sectional area of the outlet, or both, and that thereby the supply of the paper stock can be increased or decreased to the desired extent.

While I have illustrated and described one specific embodiment of my invention, nevertheless it is intended and understood that the invention is not limited to the specific details of this embodiment, but that various modifications can be made therein without departing from the spirit and scope of the invention, as set forth in the accompanying claims.

What I claim is:

1. Regulating apparatus for wet paper stock comprising a regulating box provided with an overflow dam for maintaining a constant head of the paper stock therein and with means for supplying the paper stock thereto and for removing the overflow therefrom, said regulating box being further provided with an outlet pipe or spout of suitable length and cross-sectional area to offer a frictional resistance varying with the paper stock consistency and to give an outflow velocity and volume of the paper stock therethrough approximately inversely proportional to the paper stock consistency, whereby an approximately constant equivalent weight of dry paper stock is discharged therethrough per unit of time in an automatic and continuous manner; substantially as described.

2. Regulating apparatus for wet paper stock comprising a regulating box provided with an adjustable overflow dam for maintaining a constant head of the paper stock therein and with means for supplying the paper stock thereto and for removing the overflow therefrom, said regulating box being further provided with an outlet pipe or spout of suitable length and cross-sectional area to offer a frictional resistance varying with the paper stock consistency and to give an outflow velocity and volume of the paper stock therethrough approximately inversely proportional to the paper stock consistency, whereby an approximately constant equivalent weight of dry paper stock is discharged therethrough per unit of time in an automatic and continuous manner, and whereby the outflow velocity and volume, and the equivalent weight of dry paper stock can be increased or decreased by raising or lowering said adjustable overflow dam, and thus increasing or decreasing the constant head in the regulating box; substantially as described.

3. Regulating apparatus for wet paper stock comprising a regulating box provided with an overflow dam for maintaining a constant head of the paper stock therein and with means for supplying the paper stock thereto and for removing the overflow therefrom, said regulating box being further provided with an outlet pipe or spout of adjustable cross-sectional area, said pipe or spout being of suitable length and cross-sectional area to offer a frictional resistance varying with the paper stock consistency and to give an outflow velocity and volume of the paper stock therethrough approximately inversely proportional to the paper stock consistency, whereby an approximately constant equivalent weight of dry paper stock is discharged therethrough per unit of time in an automatic and continuous manner, and whereby the outflow volume, and the equivalent weight of dry paper stock, can be increased and decreased by increasing or decreasing the cross-sectional area of said outlet pipe or spout; substantially as described.

4. Regulating apparatus for wet paper stock comprising a regulating box provided with an adjustable overflow dam for maintaining a constant head of the paper stock therein and with means for supplying the paper stock thereto and for removing the overflow therefrom, said regulating box being further provided with an outlet pipe or spout of adjustable cross-sectional area, said pipe or spout being of suitable length and cross-sectional area to offer a frictional resistance varying with the paper stock consistency and to give an outflow velocity and volume of the paper stock therethrough approximately inversely proportional to the paper stock consistency, whereby an approximately constant equivalent weight of dry paper stock is discharged therethrough per unit of time in an automatic and continuous manner, and whereby the outflow volume, and the equivalent weight of dry paper stock, can be increased or decreased either by raising or lowering said adjustable overflow dam, and thus increasing or decreasing the constant head in the regulating box, or by increasing or decreasing the cross-sectional area of said outlet pipe or spout; substantially as described.

5. Regulating apparatus for wet paper stock comprising a regulating box provided with an overflow dam for maintaining a constant head of the paper stock therein and with means for supplying the paper stock thereto and for removing the overflow therefrom, said regulating box being further provided with an outlet pipe or spout of uniform width, an adjustable top therefor for increasing and decreasing the cross-sectional area thereof, and means for adjusting said top uniformly throughout its length, said pipe or spout being of suitable length and cross-sectional area to offer a frictional resistance varying with the paper stock consistency and to give an outflow velocity and volume of the paper stock therethrough approximately inversely proportional to the paper stock consistency, whereby an approximately constant equivalent weight of dry paper stock is discharged therethrough per unit of time in an automatic and continuous manner, and whereby the outflow volume and the equivalent weight of dry paper stock can be increased and decreased by increasing or decreasing the cross sectional area of said outlet pipe or spout; substantially as described.

In testimony whereof I affix my signature.

EDWARD J. TRIMBEY.